H. Berdan,
Bread Machine,
Nº 18,180. Patented Sep. 15, 1857.
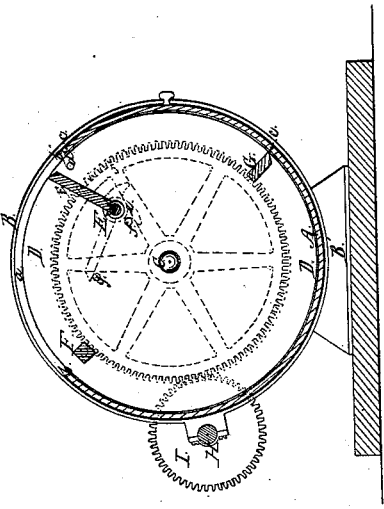
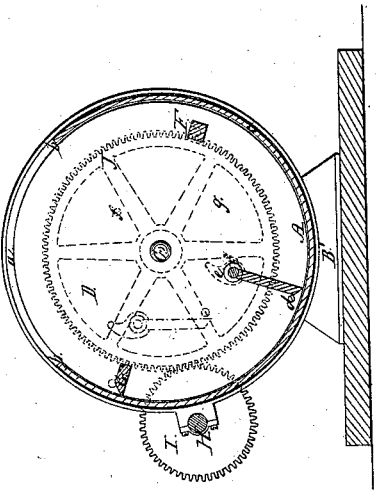
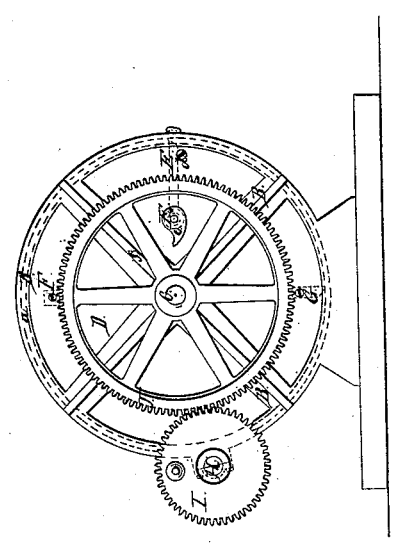
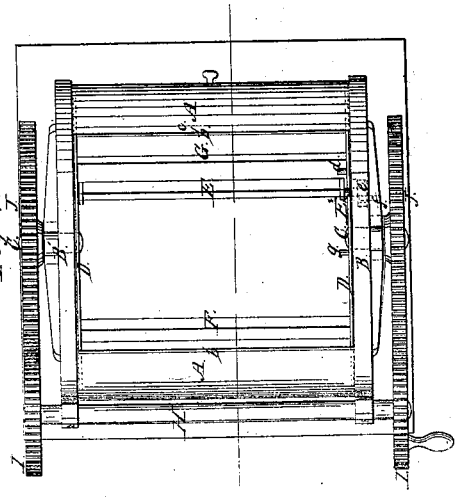

UNITED STATES PATENT OFFICE.

HIRAM BERDAN, OF NEW YORK, N. Y.

MACHINE FOR KNEADING DOUGH.

Specification of Letters Patent No. 18,180, dated September 15, 1857.

*To all whom it may concern:*

Be it known that I, HIRAM BERDAN, of the city, county, and State of New York, have invented a new and useful Improvement in Machinery for Kneading Dough; and I do hereby declare that the following is a full, clear, and exact description of the same, reference being had to the accompanying drawings, forming part of this specification, in which—

Figure 1, is an end view of a kneading machine with the improvement applied. Fig. 2, is a plan of the same. Figs. 3 and 4, are transverse vertical sections of the same in different conditions.

Similar letters of reference indicate corresponding parts in the several figures.

The object of this invention is to subject dough, through the agency of machinery, to an operation resembling that of kneading by hand which operation consists not only in mixing the flour, water and yeast or other ferment thoroughly, but in opening the mass, dividing it, and reuniting it repeatedly, thereby causing air to enter it and be retained within it in large quantities and distributed throughout it in small cellules making a very light bread with a small quantity of yeast or ferment. The invention consists chiefly in what is hereinafter termed the "flopper" which is a swinging blade attached to a wheel or carrier that rotates within a barrel or trough in which the flour water and yeast or other ferment are placed. This flopper has such a motion imparted to it, besides the rotary motion it derives from the wheel or carrier to which it is attached that at every revolution of the carrier it (the flopper) cuts into opens and divides the mass of dough or other material in the barrel or trough, takes up a large portion of it, turns the said portion over, and throws it down upon the portion remaining at the bottom of the barrel or trough, thus imitating some of the movements made by hand in kneading, and by attaching to the revolving wheel or carrier which carries the said flopper, one or more rigid bars to revolve within the trough and work through the dough, the operation of kneading by hand which makes a very superior bread to any heretofore kneaded by machinery is almost exactly imitated.

A B B′, is the stationary barrel or trough in which the kneading is performed consisting of a vessel of cylindrical or other circular form arranged with its axis in a horizontal position. The sides A of this vessel are made of wooden staves or of sheet iron and the heads consist of two open wheel-like standards B, B′, in the inner face of each of which is a groove *a*, to receive the ends of A. The standards B B′, are intended to be bolted to a suitable bed plate or to a floor and they may be stayed together by horizontal stays outside of the trough. In the top of this trough A B B′, there is represented at Fig. 3, a wide opening *b, b,* for the introduction of the flour, water and ferment of which the dough is to be made; but a portion *c, c,* of one side of the trough is made so as to be capable of sliding in the groove *a*, in such a manner as to open the side of the vessel instead of the top to allow the dough to be discharged from the trough after it has been sufficiently kneaded.

C C D D, is a rotating carrier which carries the flopper E and the bars F and G, which effect the kneading operation. This carrier consists of two short shafts C, C, arranged in line with one another and working in bearings in the centers of the heads B, B′, of the trough, and each having rigidly keyed or otherwise secured to it one of the two circular plates D, D, which occupy positions nearly close to the open heads B, B′, and whose circumferences are such that they will just rotate within the trough. The plates D, D, thus constitute practically the ends of the trough. The said plates are stayed together rigidly by the two rigid straight wooden bars F, G, which extend from one to the other and parallel with the shatfs C, C, and which are bolted to the said plates D, D. The bar F, whose duty it is to stir and mix the flour water and ferment together may be of square round or polygonal form but the square form is to be preferred. It is placed at some distance from the sides of the trough. The bar G whose duty it is to scrape the dough from the sides of the trough is made of flat form and arranged with its broader sides or faces radial or nearly so to the shafts C, C; and it is beveled on its outer edge.

The flopper E is a broad wooden blade extending the whole of the distance between the two plates D, D, or ends of the trough, and attached at one edge by suitable iron straps or other contrivances at each end to a shaft E*, which is fitted to bearings in the plates D, D, and permitted to turn therein far enough for the flopper to move between the pins $d$ and $g$, which are secured in one of the plates D, D.

The shaft E* carries at one end outside of the plate D, in which that end is supported, a wiper $e$, which by the rotary motion of the carrier is brought into contact with a fixed stud $f$, projecting from the inner side of the standard B, and caused to receive and impart to the shaft E*, the motion necessary to shift the flopper from a position of rest against the pin $d$, over against the pin $g$, such movement of the flopper taking place as the flopper arrives near its highest position and serving to turn over the dough which it has taken up from the bottom of the trough and drop or throw it back to the bottom again.

H is the driving shaft of the machine fitted to turn in bearings on the standards B, B'. This shaft which may be turned by a hand crank or be driven by power, carries two small spur wheels I, gearing with larger wheels J, J, one on each of the carrier shafts C, C, which require to have quite a slow motion, say from 8 to 12 revolutions per minute.

The operation of kneading is performed in this machine in the following manner:—As much flour as will fill the trough to one-third of its depth, with the requisite quantity of water and ferment to convert it into dough, having been put into the trough through the opening $b, b$, in the top, motion is given to the shaft I, to cause the rotary motion of the carrier and the revolution of the bar F scraper G, and flopper E in the direction of the arrow shown in Figs. 1, 3 and 4. While the bar F, stirs and mixes the flour, water, and ferment well together by passing through the middle of the mass, the scraper G, scrapes the bottom and sides of the trough and prevents any part of the mass from remaining adhering thereto and thereby escaping the mixing operation. The flopper E, during the descending portion of its revolution generally rests against the pin $g$, as shown in red outline in Fig. 4, till its edge strikes the dough or material in the lower part of the trough, though it may sometimes descend so far without coming in contact therewith as to hang loosely below its shaft E*; but as soon as the edge touches the dough or material and meets with a resistance, it is held back in some degree and the flopper by the continued onward movement of its shaft E*, is made gradually to assume a position radial to the center of the trough and axis of the carrier with its edge nearly touching the surface of the trough in which position it is arrested by the pin $d$. Fig. 4 exhibits in black outline the position of the flopper at the instant of its coming in contact with the pin $d$. The flopper in moving to the radial position cuts into the mass in the trough as illustrated in Fig. 4 and as it moves onward it carries a great portion of the mass before it and up one side of the trough, retaining its radial condition relatively to the trough, till it arrives near the mouth $b, b$, of the trough, by which time the wiper $e$, comes in contact with the stationary stud $f$, as shown in Fig. 3 in black outline. The continued revolution of the flopper with the carrier after this takes place causes the flopper, through the movement which the wiper derives in part from the stud $f$, and in part from its revolution with the carrier; to move over to the pin $g$, as shown in red outline in Fig. 3, and thus turn over the dough or partly made dough which it has carried up, and which now being unsupported falls back to the bottom of the trough and reunites with the portion remaining there. Any tendency of the dough to stick to the flopper after the latter is turned over will be overcome by the flopper always coming down on to the pin $g$, with some violence whenever the dough adheres. The above described operation is repeated at every revolution of the carrier and the dough is in a short time sufficiently mixed and kneaded. When the kneading operation is completed, the slide $c, c$, is intended to be moved upward in the groove $a$, to open the trough at the side to enable the dough to be swept out of the trough by the movement of the flopper E and scraper G.

Instead of constructing the trough with open heads B, B', and the carrier with circular plates D, D, of the full size of the circular interior of the trough as described, the heads B, B', of the trough may be made of closed plates; and instead of its being provided with circular plates D, D, the carrier shafts C, C may simply be provided with arms to carry the bar F, scraper G, flopper E, and pins $d, g$.

The machine may be employed with as much advantage in kneading dough for hard or ship bread or crackers as in kneading dough for family bread, as it does not beat the dough by excessive friction and destroy the life of the flour like the machines at present in use for that purpose.

What I claim as my invention and desire to secure by Letters Patent is—

The employment in a kneading machine of a flapper E, applied and operated in any manner substantially as herein set forth.

HIRAM BERDAN

Witnesses:
H. A. V. POST,
O. MACDANIEL.